US012764783B2

(12) United States Patent
Schober et al.

(10) Patent No.: US 12,764,783 B2
(45) Date of Patent: Oct. 13, 2026

(54) ADAPTIVE LISTEN-BEFORE-TALK MODE SELECTION

(71) Applicant: NOKIA TECHNOLOGIES OY, Espoo (FI)

(72) Inventors: Karol Schober, Helsinki (FI); Kari Juhani Hooli, Oulu (FI); Timo Erkki Lunttila, Espoo (FI); Esa Tapani Tiirola, Oulu (FI)

(73) Assignee: Nokia Technologies, Espoo (FI)

( * ) Notice: Subject to any disclaimer, the term of this patent is extended or adjusted under 35 U.S.C. 154(b) by 559 days.

(21) Appl. No.: 18/271,293

(22) PCT Filed: Jan. 11, 2022

(86) PCT No.: PCT/EP2022/050407
§ 371 (c)(1),
(2) Date: Jul. 7, 2023

(87) PCT Pub. No.: WO2022/152680
PCT Pub. Date: Jul. 21, 2022

(65) Prior Publication Data
US 2024/0306195 A1 Sep. 12, 2024

(30) Foreign Application Priority Data
Jan. 13, 2021 (FI) .................................... 20215038

(51) Int. Cl.
*H04W 4/00* (2018.01)
*H04W 74/0808* (2024.01)

(52) U.S. Cl.
CPC .............................. *H04W 74/0808* (2013.01)

(58) Field of Classification Search
CPC ................................................ H04W 74/0808
See application file for complete search history.

(56) References Cited

U.S. PATENT DOCUMENTS

2017/0099678 A1* 4/2017 Dinan .............. H04W 74/0808
2017/0223740 A1* 8/2017 Mallik ............. H04W 72/0446
(Continued)

FOREIGN PATENT DOCUMENTS

WO 2019/195465 A1 10/2019

OTHER PUBLICATIONS

International Search Report and Written Opinion dated Apr. 28, 2022 corresponding to International Patent Application No. PCT/EP2022/050407.

*Primary Examiner* — Elisabeth Benoit Magloire
(74) *Attorney, Agent, or Firm* — Lippes Mathias LLP

(57) ABSTRACT

There is provided an apparatus, a method and a computer program product. In accordance with an embodiment the method comprises obtaining one or more configurations for at least one of a listen-before-talk on-mode and one or more configurations for a listen-before-talk off-mode, wherein each configuration includes at least one functionality specific to the associated listen-before-talk mode; determining which listen-before-talk mode shall be applied; examining which of the one or more configurations is associated with the indicated listen-before-talk mode; selecting the configuration associated with the indicated listen-before-talk mode; and activating or deactivating one or more of the functionalities defined by the selected configuration in the operation of the user equipment.

11 Claims, 5 Drawing Sheets

(56) References Cited

U.S. PATENT DOCUMENTS

| | | | |
|---|---|---|---|
| 2018/0152954 | A1* | 5/2018 | Golitschek Edler Von Elbwart et al. ....... H04L 5/0092 |
| 2018/0343676 | A1* | 11/2018 | Yerramalli ........ H04W 74/0808 |
| 2019/0104546 | A1 | 4/2019 | Chendamarai Kannan et al. |
| 2021/0029641 | A1* | 1/2021 | Khoshnevisan ...... H04L 1/1864 |
| 2021/0400716 | A1* | 12/2021 | Zhang ............... H04W 74/0808 |
| 2022/0014337 | A1* | 1/2022 | Ouchi ............... H04W 74/0808 |
| 2022/0039016 | A1* | 2/2022 | Terry ................ H04W 74/0808 |
| 2022/0039158 | A1* | 2/2022 | Awadin ............. H04W 74/0816 |
| 2022/0104258 | A1* | 3/2022 | Moon ..................... H04L 5/001 |
| 2022/0141805 | A1* | 5/2022 | Tooher .................. H04L 5/0053 370/336 |
| 2022/0174734 | A1* | 6/2022 | Li ........................... H04L 5/001 |
| 2022/0191966 | A1* | 6/2022 | Wang ................ H04W 52/0216 |
| 2024/0089983 | A1* | 3/2024 | Koorapaty .......... H04W 72/232 |

* cited by examiner

ADAPTIVE LISTEN-BEFORE-TALK MODE SELECTION

TECHNICAL FIELD

The present invention relates to a method, apparatus and computer program product for adaptive listen-before-talk selection.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. In 5G systems a base station may have a MIMO (Multiple In Multiple Out) antenna array comprising dozens of individual antenna elements.

A listen-before-talk (LBT) principle is a method in which a communication device first listens a communication channel where the communication device intends to transmit and only if the communication channel is not occupied (not busy) i.e. there is no transmissions going on by other communication devices the communication device starts the transmission.

SUMMARY

Some embodiments provide a method and apparatus for adaptive listen-before-talk selection.

Some embodiments are implemented in the context of the 5G communication systems and relate to a UE implementation of mechanisms for adaptive listen-before-talk selection.

In this disclosure the 60 GHz unlicensed frequency bands is mainly considered and, more specifically, co-channel coexistence. This disclosure relates to 3GPP New Radio (NR) physical layer design, as part of 3GPP RAN1 R17 WID.

Some regulations for operation on 60 GHz unlicensed spectrum require use of a spectrum sharing or co-channel coexistence mechanism, but do not require any specific type of a mechanism. In some regions, separate regulatory requirements are defined for different use cases or deployments, e.g. for fixed outdoor equipment or point-to-point communications or for indoor-only use.

According to one approach, selection of the LBT mode (i.e. whether LBT is used or not) may be done in a cell (or node) specific manner. Another approach considered is to determine the mode separately per beam or spatial direction. This would increase opportunities for the non-LBT operation.

Selection of the LBT per beam or spatial direction may be taken into account in the system design. For example, coexistence issues may occur relatively frequently on certain beam direction, while another beam may be free from interference. On the other hand, a UE moving to the coverage area of a beam having co-existence issues may need to change its channel access mode from the no-LBT mode to the LBT mode. Alternatively, a gNB may determine a need for LBT for certain UEs.

When a gNB operates with LBT, there is additional complexity on both sides of the radio link, not only related to LBT procedure itself. The UE operation may be strongly dependent on channel occupancy time (COT) structure indicated in a group common physical downlink control channel (GC-PDCCH), including the slot formats. The UE has to perform validation of periodic channel state information-reference symbols (CSI-RS) on a cell where LBT is performed. When the UE performs periodic measurements and reporting for channel state information, the UE may not be allowed to average channel state information measurements across multiple time instances of CSI-RS on a cell where LBT is performed. When the UE performs measurements and reporting for interference, the UE may not be allowed to average interference measurements across multiple time instances of measurement on a cell where LBT is performed. There are different PDCCH monitoring needs for a UE depending on whether the PDCCH is transmitted at the beginning or in the middle of a COT. It should be noted that these are just some examples of potential consequences and also other consequences may exist.

When gNB switches off the LBT-mode, also the UE may switch off the LBT related procedures, which simplifies UE operation considerably, and has a positive effect on power consumption and system efficiency. In this disclosure some mechanisms for facilitating LBT mode switching are described, making use of the current NR signalling framework.

According to an approach of the disclosure a base station gNB performing listen-to-talk selection i.e. whether the LBT functionality is in use or not may impact a preferred UE configuration. It may also be desirable that the gNB can turn on the LBT mode for certain beam(s), carrier(s) or UE(s) relatively fast, to adapt to rapid changes in coexistence conditions.

According to an embodiment, there is provided a method, to be employed by a network element, to perform indication signalling regarding listen-before-talk procedures.

According to some aspects, there is provided the subject matter of the independent claims. Some further aspects are defined in the dependent claims. The embodiments that do not fall under the scope of the claims are to be interpreted as examples useful for understanding the disclosure.

It should be noted that the order of steps presented in connection with different aspects and embodiments of this disclosure may differ from the order they are disclosed.

According to a first aspect there is provided a network element for a wireless communication network comprising:

- means for determining which listen-before-talk modes among a listen-before-talk on-mode and listen-before-talk off-mode a base station of the wireless communication network may utilize in communication by the base station;
- means for defining one or more configurations for at least one of a listen-before-talk on-mode and one or more configurations for a listen-before-talk off-mode, wherein each configuration includes at least one functionality specific to the associated listen-before-talk-mode;
- means for sending the user equipment the one or more configurations; and
- means for providing an indication of the listen-before-talk mode.

According to a second aspect there is provided a method comprising:

- determining which listen-before-talk modes among a listen-before-talk on-mode and listen-before-talk off-mode a base station of the wireless communication network may utilize in communication by the base station;
- defining one or more configurations for at least one of a listen-before-talk on-mode and one or more configurations for a listen-before-talk off-mode, wherein each configuration includes at least one functionality specific to the associated listen-before-talk-mode;
- sending the user equipment the one or more configurations; and
- providing an indication of the listen-before-talk mode.

According to a third aspect there is provided an apparatus comprising at least one processor; and at least one memory including computer program code the at least one memory and the computer program code configured to, with the at least one processor, cause the apparatus to perform at least the following:

- determine which listen-before-talk modes among a listen-before-talk on-mode and listen-before-talk off-mode a base station of the wireless communication network may utilize in communication by the base station;
- define one or more configurations for at least one of a listen-before-talk on-mode and one or more configurations for a listen-before-talk off-mode, wherein each configuration includes at least one functionality specific to the associated listen-before-talk-mode;
- send the user equipment the one or more configurations; and
- provide an indication of the listen-before-talk mode.

According to a fourth aspect there is provided a computer program comprising computer readable program code which, when executed by at least one processor; cause the apparatus to perform at least the following:

- determine which listen-before-talk modes among a listen-before-talk on-mode and listen-before-talk off-mode a base station of the wireless communication network may utilize in communication by the base station;
- define one or more configurations for at least one of a listen-before-talk on-mode and one or more configurations for a listen-before-talk off-mode, wherein each configuration includes at least one functionality specific to the associated listen-before-talk-mode;
- send the user equipment the one or more configurations; and
- provide an indication of the listen-before-talk mode.

According to a fifth aspect there is provided an apparatus comprising:

- a first circuitry configured to determine which listen-before-talk modes among a listen-before-talk on-mode and listen-before-talk off-mode a base station of the wireless communication network may utilize in communication by the base station;
- a second circuitry configured to define one or more configurations for at least one of a listen-before-talk on-mode and one or more configurations for a listen-before-talk off-mode, wherein each configuration includes at least one functionality specific to the associated listen-before-talk-mode;
- a third circuitry configured to send the user equipment the one or more configurations; and
- a fourth circuitry configured to provide an indication of the listen-before-talk mode.

According to a sixth aspect there is provided a user equipment comprising:

- means for obtaining one or more configurations for at least one of a listen-before-talk on-mode and one or more configurations for a listen-before-talk off-mode, wherein each configuration includes at least one functionality specific to the associated listen-before-talk-mode;
- means for determining which listen-before-talk mode shall be applied;
- means for examining which of the one or more configurations is associated with the indicated listen-before-talk mode; and
- means for selecting the configuration associated with the indicated listen-before-talk mode; and
- means for activating or deactivating one or more of the functionalities defined by the selected configuration in the operation of the user equipment.

According to a seventh aspect there is provided a method comprising:

- obtaining one or more configurations for at least one of a listen-before-talk on-mode and one or more configurations for a listen-before-talk off-mode, wherein each configuration includes at least one functionality specific to the associated listen-before-talk-mode;
- determining which the listen-before-talk mode shall be applied;
- examining which of the one or more configurations is associated with the indicated listen-before-talk mode;
- selecting the configuration associated with the indicated listen-before-talk mode; and
- activating or deactivating one or more of the functionalities defined by the selected configuration in the operation of the user equipment.

According to an eighth aspect there is provided an apparatus comprising at least one processor; and at least one memory including computer program code the at least one memory and the computer program code configured to, with the at least one processor, cause the apparatus to perform at least the following:

- obtain one or more configurations for at least one of a listen-before-talk on-mode and one or more configurations for a listen-before-talk off-mode, wherein each configuration includes at least one functionality specific to the associated listen-before-talk-mode;
- determine which the listen-before-talk mode shall be applied;
- examine which of the one or more configurations is associated with the indicated listen-before-talk mode;
- select the configuration associated with the indicated listen-before-talk mode; and
- activate or deactivate one or more of the functionalities defined by the selected configuration in the operation of the user equipment According to a ninth aspect there is provided a computer program comprising computer readable program code which, when executed by at least one processor; cause the apparatus to perform at least the following:

- obtain one or more configurations for at least one of a listen-before-talk on-mode and one or more configurations for a listen-before-talk off-mode, wherein each configuration includes at least one functionality specific to the associated listen-before-talk-mode;
- determine which the listen-before-talk mode shall be applied;
- examine which of the one or more configurations is associated with the indicated listen-before-talk mode;

select the configuration associated with the indicated listen-before-talk mode; and activate or deactivate one or more of the functionalities defined by the selected configuration in the operation of the user equipment According to a tenth aspect there is provided an apparatus comprising:

a first circuitry configured to obtain one or more configurations for at least one of a listen-before-talk on mode and one or more configurations for a listen-before-talk off mode, wherein each configuration includes at least one functionality specific to the associated listen-before-talk-mode;

a second circuitry configured to determine which listen-before-talk mode shall be applied;

a third circuitry configured to examine which of the one or more configurations is associated with the indicated listen-before-talk mode; and a fourth circuitry configured to select the configuration associated with the indicated listen-before-talk mode; and a fifth circuitry configured to activate or deactivate one or more of the functionalities defined by the selected configuration in the operation of the user equipment.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
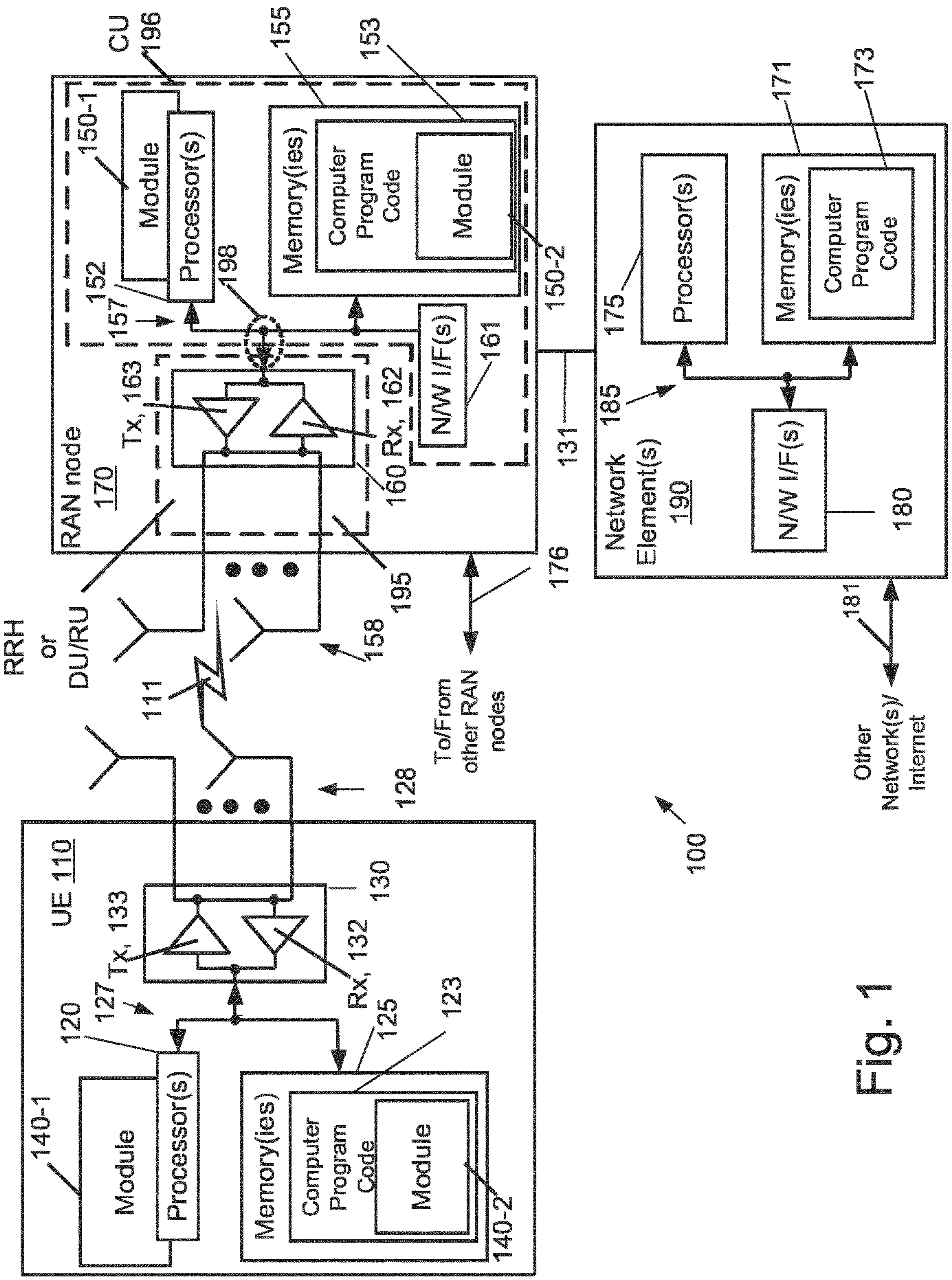
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree Cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element (s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

A base station with which a user equipment is connected or camped on, may be called as a serving base station. In practical situations the serving base station and the camped on base station may change e.g. when the user equipment in moving, or if the signal strength from different base stations changes (e.g. signals from a neighbouring base station becomes stronger than signals from the currently serving base station.

Figure 2:
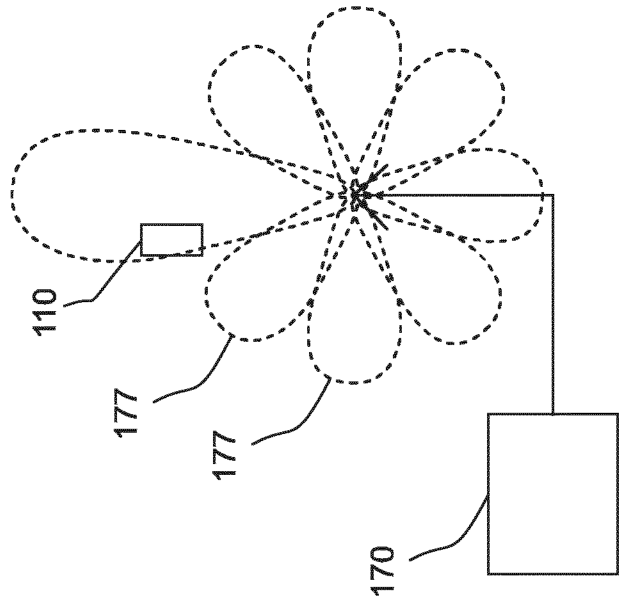
FIG. 2 illustrates in a simplified manner beams of a base station serving an exemplary user equipment.

The serving base station may have assigned one or more beams 177 (FIG. 2) for the user equipment on the basis of some criteria. For example, that beam which is directed towards the location of the user equipment may be selected for the user equipment and if the user equipment moves to another location, another beam directed towards that new location may be selected instead. In FIG. 2 most of the beams are illustrated being similar to each other and one beam is illustrated to have stronger signal than the others but in practical implementations different beams may have different parameters such as signal strength, width length etc. It should also be noted that the beams depicted in FIG. 2 are only illustrative but in reality the beams may have different forms and sizes.

In accordance with an example, the base station (a.k.a. an access point), may have one or more transmission-reception points (TRP) which transmit transmission beams to be received by user equipment(s).

A base station may have a spatial beam codebook which includes information of beams available by a base station.

In the following some example approaches regarding the LBT functionality will be discussed. According to one aspect, in order to initiate a channel occupancy i.e. transmission by a base station gNB and/or by a user equipment UE, both channel access with LBT mechanism(s) and a channel access mechanism without LBT are supported.

LBT mechanisms may include one or more of omni-directional LBT, directional LBT and receiver assisted LBT type of schemes when channel access with LBT is used.

In the following, channel access with LBT and without LBT are also referred to as LBT mode and no-LBT mode, respectively.

Selection of the LBT mode (i.e. whether LBT is used or not) may be done in the cell (or node) specific manner. Another approach considered in this disclosure is to determine the mode separately per beam or spatial direction. This would increase opportunities for the non-LBT operation.

When a system utilizes both the LBT mode and the non-LBT mode some issues may be taken into account. For example, the LBT functionality may be designed to be per beam, wherein the LBT mode and/or the no-LBT mode are implemented on certain subset of available beams of the base stations, or based on spatial direction, wherein the LBT mode and/or the no-LBT mode are implemented on certain direction or directions from the base station. Namely, coexistence issues may occur relatively frequently on certain beam direction(s), while another beam may be free from interference. The beams with different LBT mode can be e.g. SSB beams (i.e. gNB beams carrying up-to N (e.g. up-to 64) synchronization signal blocks. Alternatively, and/or additionally, the beams with different LBT mode can be beams determined by CSI-RS (channel state information RS). Depending on the LBT scenario, term "beam" may cover also the corresponding UE Tx/RX beam. In this case, the disclosure deals with "beam pair link" comprising gNB Tx/Rx beam, and the associated UE Rx/Tx beam.

A UE moving to the coverage area of a beam having co-existence issues may need to change its channel access mode from the no-LBT mode to the LBT mode. Alternatively, the base station gNB may determine a need for LBT for certain UEs within a serving area of the base station.

When a base station gNB operates with LBT, there may be additional complexity on both sides of the radio link, not only related to LBT procedure itself. UE operation may strongly be dependent on a channel occupancy structure (COT) which may be indicated in a group common physical downlink control channel (GC-PDCCH), including slot formats. The UE performs validation of periodic channel state information-reference symbol operations (periodic-CSI-RS) on a cell where LBT is performed. In other words, the UE receives periodic-CSI-RS signals and estimates properties of the channel and sends a channel quality information report back to the gNB.

There are also different PDCCH monitoring needs for a UE depending on whether the PDCCH is transmitted at the beginning or in the middle of a channel occupancy structure when gNB operates with LBT. There are no such differences on the PDCCH monitoring needs when gNB does not operate with LBT.

In the following, some mechanisms for facilitating LBT mode switching will be described in more detail, making use of the current NR signalling framework.

The signalling framework for LBT-mode switching can be characterized as follows.

A base station gNB serving user equipment sends a set of configurations including an indication whether the LBT mode is set on or off. If the LBT mode is per beam, the indication may also indicate the beams or beam pattern(s) and/or code books in which the LBT mode is on or off. It should be noted that it may not be necessary to indicate both LBT on mode and LBT off mode but, for example, LBT on mode is indicated wherein if the indication is absent the UE may determine that the LBT mode is off, or vice versa. Furthermore, in the per beam LBT implementation only those beams where LBT mode is on (or off) could be indicated wherein an absent indication can be interpreted to indicate the inverse LBT mode i.e. LBT mode off (or LBT mode on). When the UE receives from the gNB the set of configurations including the LBT mode indication(s), the UE uses the received indication(s) to deduce e.g. by an LBT mode analyzer 1030 (FIG. 5) whether the UE should switch the LBT mode on or off e.g. by an LBT mode switcher 1032.

For example, in the per beam mode the UE may switch the LBT mode on when such a beam becomes a serving beam to the UE in which the LBT mode has been switched on by the gNB.

Both configurations (LBT on/LBT off) contain one or more gNB/UE functionalities which are adjusted based on the selected LBT mode. Therefore, when the gNB switches LBT on, the gNB adjusts those gNB functionalities which are indicated by the configuration to be related to the LBT on mode. Also, the UE adjusts those UE functionalities which are indicated by the configuration to be related to the LBT on mode.

The indication can be link and/or bandwidth part (BWP) specific. In an embodiment of the disclosure, the indication is common for both link directions (uplink, i.e. from the UE to the gNB, downlink, i.e. from the gNB to the UE), in some embodiments the indication is also cell or cell-group specific.

The indication can be explicit e.g. included in a control message transmitted by the gNB to the UE. However, an explicit indication may not be needed if the LBT mode can be deduced from some other information i.e. the indication is implicit. For example, the indication whether the LBT mode is on or off may be associated with a bandwidth part (BWP) switching.

A bandwidth part is a contiguous set of physical resource blocks (PRBs) on a given carrier. The resource blocks may be selected from a contiguous subset of common resource blocks for a given numerology. It is denoted by BWP. Each BWP defined for a numerology can have the following three different parameters: Subcarrier spacing; Symbol duration and Cyclic prefix (CP) length.

The UE can be configured with a certain maximum bandwidth parts for downlink and for uplink, but only one BWP can be simultaneously active for downlink and one BWP for uplink.

The UEs are expected to receive and transmit only within the frequency range configured for the active BWPs with the associated numerologies. However, a UE may perform radio resource management (RRM) measurement or transmit sounding reference signal (SRS) outside of its active BWP via a measurement gap.

In the following some further examples for LBT mode indication are described:

RRC Configuration:

For each serving cell the network configures at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell. The bandwidth part configuration is split into uplink and downlink parameters and into common and dedicated parameters. Common parameters (in BWP-UplinkCommon and BWP-DownlinkCommon) are "cell specific" and the network may ensure the necessary alignment with corresponding parameters of other UEs. The common parameters of the initial bandwidth part of the PCell are also provided via system information. For all other serving cells, the network provides the common parameters via dedicated signalling.

In accordance with an embodiment of the disclosure, as a part of the BWP configuration there may be a specific flag or a switch, indicating whether or not LBT is assumed to be applied on that BWP. Therefore, if a BWP switching is performed, the UE may deduce from the LBT flag or switch dedicated to the target BWP whether the LBT is to be switched on or off.

MAC Control Element (CE)

In accordance with an embodiment of the disclosure, the MAC control element may contain an explicit LBT indication (i.e. dedicated MAC CE defined for indicating the LBT mode), or the LBT indication may be implicit e.g. so that the LBT switching is a part of the MAC CE associated to BWP switching.

L1 Signaling

In accordance with an embodiment of the disclosure, e.g. Group-Common PDCCH (GC-PDCCH), e.g. DCI Format 2_0, may carry an indication of whether LBT is applied on the cell, the BWP, or the beam associated with the GC-PDCCH for a certain number of upcoming slots. An implicit LBT indication may be implemented e.g. so that the LBT switching is part of the DCI associated with BWP switching.

Timer

In accordance with an embodiment of the disclosure, an implicit LBT indication may be associated with a BWP switching timer, for example.

Depending on whether the LBT mode is on or off, the following set of functionalities may become activated/deactivated. Such candidate functionalities include at least one of or any combination of slot format indication (SFI), PDCCH monitoring, setting UE configuration on DRX and UE power saving features, and/or changing interference reporting configuration.

In some scenarios the activation and/or deactivation of the UE functionalities is limited to one link direction only, for example to the uplink direction or the downlink direction.

The slot format indication may be used to inform the UE whether an OFDM symbol is for downlink, uplink or flexible. The SFI can indicate link direction over one or many slots. This may be configured through RRC. The SFI carries an index to a pre-configured UE-specific table, which may be configured through RRC. The SFI can either be dynamic, wherein it is transmitted through a DCI (e.g. GC-PDCCH), or static or semi-static, wherein it is transmitted through RRC.

In the slot format indication, the UE may determine whether to follow semi-static configuration or dynamic adaptation. This determination may be based on e.g. contents of a GC-PDCCH. The dynamic adaptation is to be used with the LBT mode. This may be in a form of enabling (or disabling) semi-static configuration at the next period boundary. The gNB may stop (or start) transmitting GC-PDCCH. The UE may stop (or start) monitoring GC-PDCCH. The period may be configured in SIB or in a UE-specific manner.

In the PDCCH monitoring, the UE may change the GC-PDCCH monitoring behaviour based on the LBT mode. This may also cover the GC-PDCCH contents (GC-PDCCH is beam specific). Validity of GC-PDCCH or some of the fields like e.g. slot format indication (SFI), a resource block set (RB-set) indicator and/or search space (SS) group switching trigger in GC-PDCCH may be disabled or enabled. Monitoring in PDCCH Search Space set (such as TYPE-3 CSS) may be configured to be dependent on whether the LBT-mode is on or off. If SS group switching (enabling/disabling) is configured, the SS group is adapted according to the LBT mode so that the LBT_mode is on or off depending on the indication e.g. LBT_mode_ON_SS_group or LBT_mode_OFF_SS_group.

In the setting UE configuration on DRX and UE power saving features alternative, the operation may be, for example, such that an OnDuration timer duration is reduced when LBT mode is OFF to reduce power consumption of the UE.

In the changing interference reporting configuration alternative, one option may be to adjust interference reporting to provide Rx assistance with LBT mode ON.

In the following some further description is provided to show how the LBT mode switching can be realized with different signalling approaches.

Multiple BWP Based Switching

In the multiple BWP based switching approach the gNB may configure two BWPs possibly with the same PRBs (e.g.) both in UL and DL for the UE such that one BWP applies the LBT mode, and the other BWP does not apply the LBT mode. All the regular BWP switching mechanisms would apply. This could be done, for example, by adding a new parameter (flag) into generic BWP related RRC parameters. When a BWP with LBT enabled is activated, corresponding DL and UL LBT procedures apply. In addition, the UE applies BWP specific configurations and disables semi-static TDD configuration (if any).

```
BWP ::=                          SEQUENCE {
   locationAndBandwidth             INTEGER (0..37949),
   subcarrierSpacing                SubcarrierSpacing,
   cyclicPrefix                     ENUMERATED { extended }
   lbt                              ENUMERATED {enabled}
}
```

The gNB may configure at least two dedicated UL BWPs and/or at least two dedicated DL BWPs with different functionalities with respect to LBT mode, e.g. as follows:

(DL: OFF, UL: OFF)—LBT Mode OFF

In this option the UE is configured and activated with DL-BWP #1 and UL-BWP #1. The UE may apply semi-static TDD (time division duplex) configuration (if configured). The gNB may configure PDCCH configuration (and, possibly, PUCCH configuration) according to those applied for licensed band scenario(s). The gNB may not configure UE to monitor GC-PDCCH, or the gNB may fall back from e-TYPE2 HARQ-ACK CB to a simpler TYPE2 CB, ignoring the DCI fields associated with e-TYPE2 CB. Alternatively, TYPE-3 CB may be disabled and corresponding DCI trigger ignored.

(DL: ON, UL: OFF)—LBT Mode ON Only in DL

In this option the UE is configured and activated with DL-BWP #2 and UL-BWP #2. The UE disables semi-static TDD configuration (if configured). The gNB performs LBT when initiating COT. The gNB may configure PDCCH according to floating timing and the UE may start monitoring GC-PDCCH including SFI and/or COT-end. In addition, the UE may report UE-assisted LBT information.

(DL: ON, UL: ON)—LBT Mode ON in DL and UL

In this option the UE is configured and activated with DL-BWP #3 and UL-BWP #3. The UE disables TDD semi-static configuration (if configured). The gNB performs LBT when initiating COT. The gNB may configure PDCCH according to floating timing and the UE may start monitoring GC-PDCCH including SFI and/or COT-end. The UE performs UL LBT according to indications in the UL scheduling grant. In addition, the UE may report UE-assisted LBT information.

Single BWP Based Switching

In accordance with an embodiment, when utilizing the single BWP based switching principle the gNB may be configured only with single dedicated BWP and the LBT mode is indicted with MAC-CE/GC-PDCCH/unicast-PDCCH. Such indication may comprise e.g. a code point parameter which could have one of the values indicated in the following table:

| Code point | LBT mode |
|---|---|
| 00 | LBT mode OFF in both DL and UL |
| 01 | LBT mode ON in DL |
| 10 | LBT mode ON in DL and UL |

Based on the indicated LBT mode, a UE may activate/deactivate/modify the configured parameters.

When the LBT mode off is indicated, the UE may perform at least one of or any combination of the following:

- the UE activates semi-static TDD configuration,
- disables GC-PDCCH monitoring or enable/disable monitoring of the predefine SS set, and/or
- disable UE-assisted LBT reports.

When the LBT mode on in DL is indicated, the UE may perform at least one of or any combination of the following:

- the UE de-activates semi-static TDD configuration,
- enables GC-PDCCH monitoring or enable/disable monitoring of the predefine SS set,
- enables UE-assisted LBT reports (for Rx-assisted LBT), and/or
- enables CG PUSCH, if CG PUSCH is configured to overcome or mitigate gNB LBT failures.

When LBT mode on in DL and UL is indicated, UE may perform, in addition to performing UL LBT according to indications in the UL scheduling grant, at least one of or any combination of the following:

- UE de-activates semi-static TDD configuration,
- enables GC-PDCCH monitoring, or enable/disable monitoring of the predefine SS set(s),
- enables UE-assisted LBT reports, and/or
- enables CG PUSCH, if CG PUSCH is configured to e.g. overcome or mitigate gNB LBT failures.

A gNB may configure an RRC parameter to be dependent on whether LBT mode is on.

Figure 3:
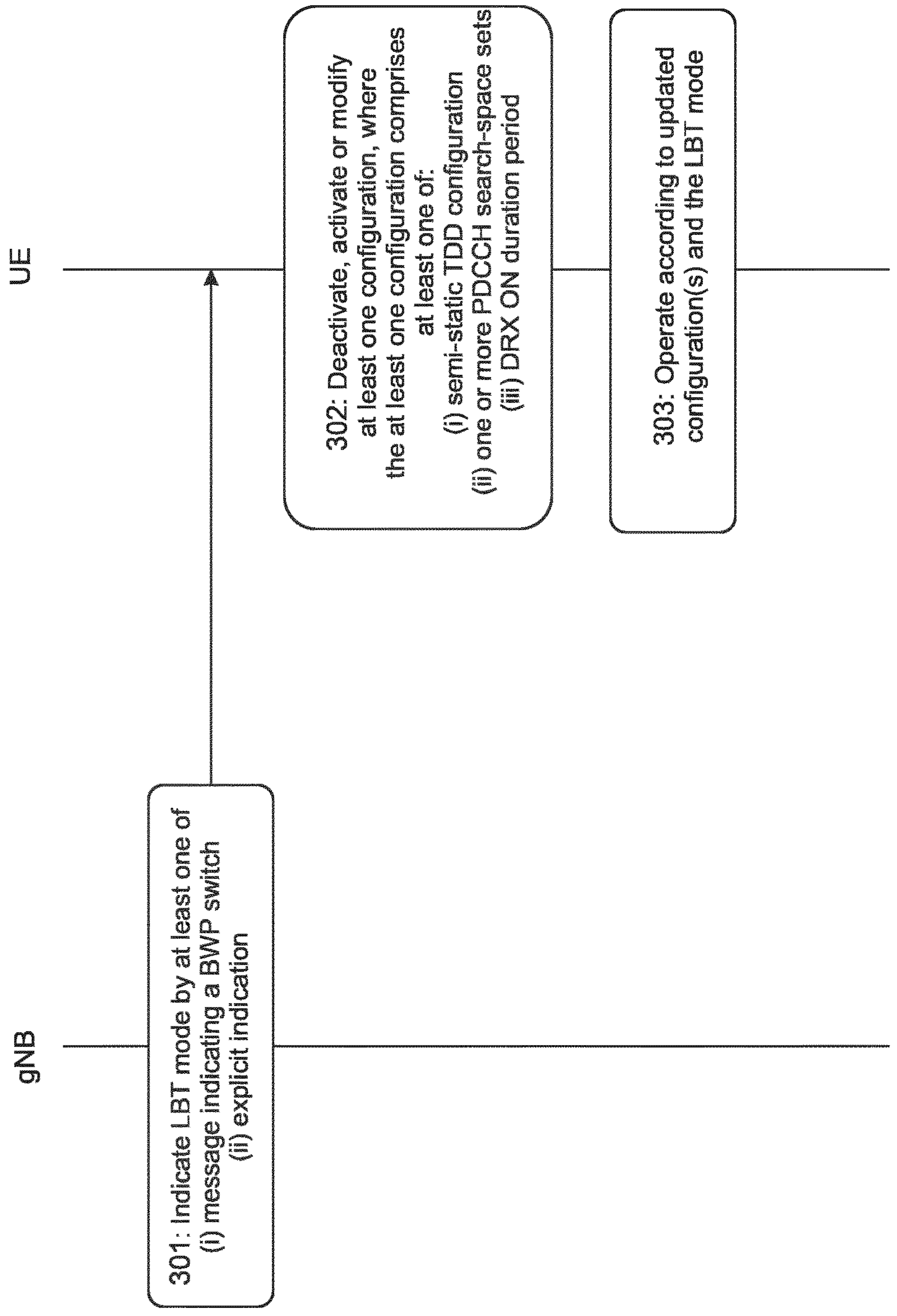
FIG. 3 shows as a flow diagram an example of signalling between a base station and a user equipment regarding the listen-before-talk operation.

FIG. 3 depicts as a flow chart signalling between a base station gNB and a user equipment UE regarding the listen-before-talk operation.

The gNB sends 301 a message which indicates the LBT mode by sending a message indicating a BWP switch and/or by some explicit indication.

The UE receives 302 the message and examines the indication. On the basis of the indication the UE deactivates, activates or modifies at least one configuration related to the LBT operation, where the at least one configuration comprises at least one of: (i) semi-static TDD configuration (ii) one or more PDCCH search-space sets (iii) DRX ON duration period. Then, the UE starts to operate 303 according to the updated configuration(s) and the LBT mode.

The approaches presented above may facilitate dynamic channel access mode selection by enabling UE power saving and more efficient system operation when channel access mode without LBT is used.

When a gNB switches off the LBT-mode, the UE may also switch off the LBT related procedures, which may simplify UE operation, and may have a positive effect on power consumption and may also have a positive effect on system efficiency i.e. the power consumption may decrease and the system efficiency may increase.

An RF frontend comprises RF circuitry between a baseband processor and one or more antenna ports. The RF frontend comprises a transmission path/chain and a reception path/chain. Examples of circuitry of the RF frontend comprise one or more band-pass filters, power amplifiers, local oscillators, and mixers. The transmission path converts a baseband signal to RF signal for feeding the RF signal to antenna via an antenna port. The reception path converts an RF signal received by an antenna connected to an antenna port to a baseband signal that is fed to the baseband part. The conversion of the signal between the baseband processor and the antenna port may be via at least one intermediate frequency. The RF frequencies may be licensed or unlicensed frequencies. Examples in accordance with at least some embodiments may utilize at least RF frequencies below 6 GHz.

A baseband signal comprises an unmodulated signal or a modulated signal comprising one or more symbols according to a modulation method. The baseband signal may be an IQ signal comprising an in-phase and a quadrature phase. An example of the modulation method is a multi-carrier modulation method such as an orthogonal frequency-division multiplexing (OFDM) scheme. The OFDM symbols may form a transmission burst for a communications channel of a wireless communications system. Examples of the communications channels comprise at least shared and dedicated communications channels that may be uplink, UL, channels or downlink, DL, channels. An uplink channel refers to a channel for transmitting data from a wireless device to an access node and a downlink channel refers to a channel for transmitting data from an access node to a wireless device.

MIMO in wireless communications is a technique that enables the transmission and reception of multiple independent data streams. This helps to increase the maximum data rate at which communications can occur reliably. Some applications of MIMO are described in the following sections.

A MIMO transceiver, MIMO TRX, comprises at least an RF frontend and antenna ports for connecting to multiple antennas for transmission, TX, and reception, RX, of a MIMO transmission. The MIMO transceiver may be capable of single antenna transmissions, e.g. Single input Multiple output, single input single output. The RF frontend may be connected to a baseband processor. The RF frontend comprise a plurality of unique hardware (HW) paths through the RF front between the baseband processor and antenna ports. The HW paths comprise transmission paths and reception paths. Each of the HW paths introduce a delay that is characteristic for a specific transmission path. A base band signal for a MIMO transmission is processed by two or more transmission paths and fed to at least two antennas via antenna ports. Transmission times of the signal via each of the antennas should be time aligned for reducing a delay margin required of the MIMO transmission.

A baseband transceiver, TRX, may be a baseband processor that performs baseband processing of transmitted and received signals via an RF frontend. A typical interface between the baseband processor and the RF frontend comprises an analog-to-digital converter, ADC, and a digital-to-analog converter, DAC. The baseband processor processes baseband signals for transmission and reception by the RF frontend.

At least some of the embodiments may be applied in a wireless communication system or a wireless communication network that supports TSN. 5G standard is seen as one example that could fit to meet very stringent requirements in terms of both latency and reliability as well as highly precise synchronization accuracy of the applications running over TSN networks. Also other standards may be feasible.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 4:
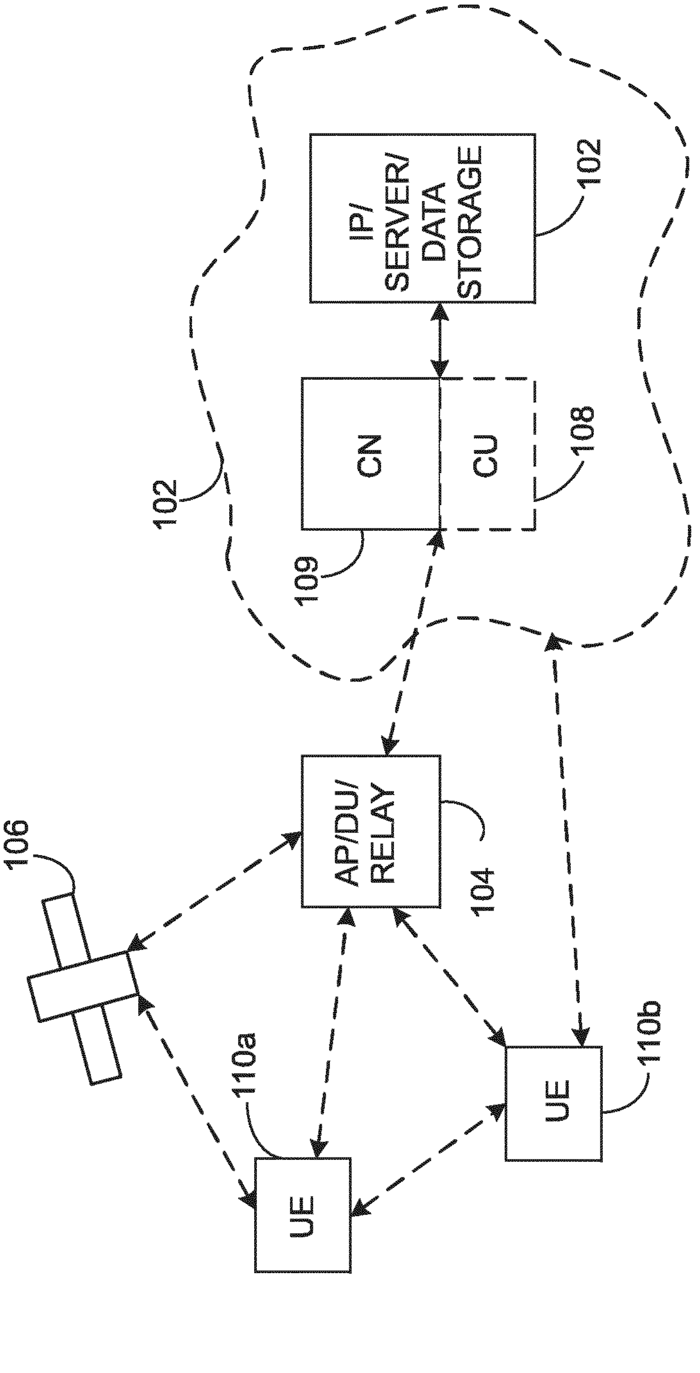
FIG. 4 shows a part of an exemplifying wireless communications access network in accordance with at least some embodiments.

FIG. 4 depicts examples of simplified system architectures only showing some elements and functional entities, all being logical units, whose implementation may differ from what is shown. The connections shown in FIG. 4 are logical connections; the actual physical connections may be different. It is apparent to a person skilled in the art that the system typically comprises also other functions and structures than those shown in FIG. 4.

The embodiments are not, however, restricted to the system given as an example but a person skilled in the art may apply the solution to other communication systems provided with necessary properties.

The example of FIG. 4 shows a part of an exemplifying radio access network.

FIG. 4 shows user equipments 110*a* and 110*b* configured to be in a wireless connection on one or more communication channels in a cell with an access node (such as (e/g) NodeB) 104 providing the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. Such link may also be called as a backhaul or a part of a backhaul. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The relay scenario may contain one or more IAB (Integrated Access and Backhaul) nodes having two separate parts: 1) Mobile termination (MT) part facilitating the (parent) backhaul connection(s) between IAB node and a parent node(s) (or IAB donor); and 2) DU (Distributed Unit) part facilitating the access (child) link connection(s) between UEs and/or (child) IAB nodes (multi-hop scenario). The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF). Functionalities defined for the gNB may be relevant for the DU part of the IAB node.

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station. Self-backhauling may provide an efficient way to combat infrastructure constraints especially in dense network deployment, where access to fibre may be limited to only some APs. The backhaul and access links share the same air interface, and all network elements (including BS, APs and UEs) may be equipped with directional antennas so that they can direct their beams in specific directions. The BS processes transmission link scheduling and adjusts transmission duration and power on both backhaul and access links. Functionalities defined for the user equipment may be relevant for the MT part of the IAB node.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 4) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 4 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 4 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 4). A HNB Gateway (HNB-GW), which is typically installed within an operator's network may aggregate traffic from a large number of HNBs back to a core network.

Figure 5:
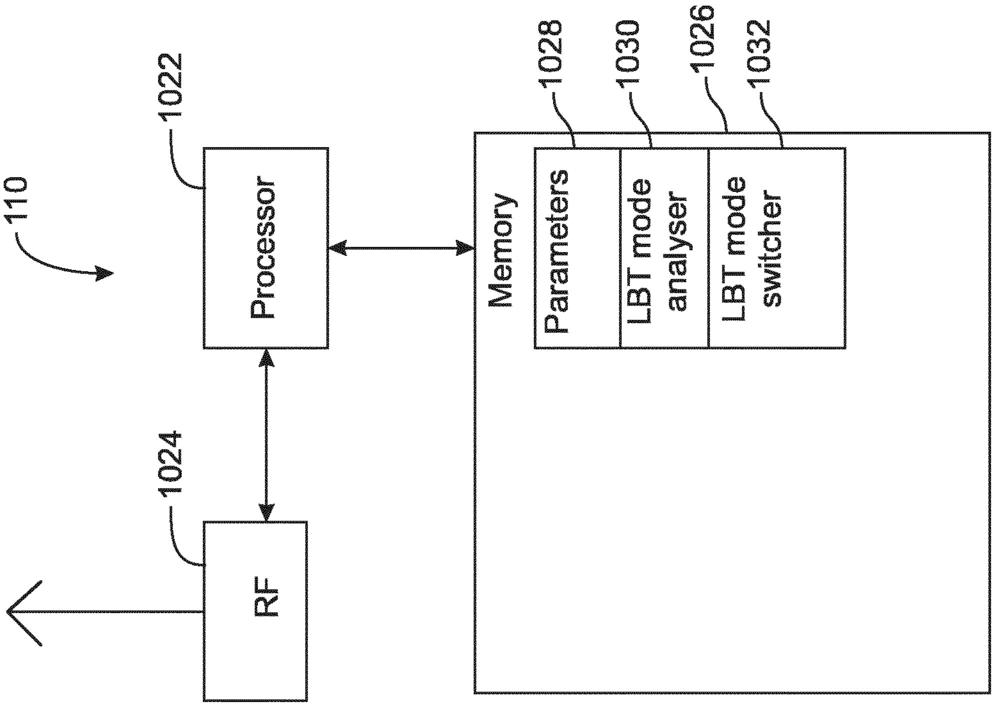
FIG. 5 shows a block diagram of an apparatus in accordance with at least some embodiments.

FIG. 5 illustrates an example of a block diagram of an apparatus 110 in accordance with at least some embodiments of the present invention. The apparatus 110 may be, for example, a part of the resource manager. The apparatus 110 comprises a processor 1022, a memory 1024 and a transceiver 1024. The processor is operatively connected to the transceiver for controlling the transceiver. The apparatus may comprise a memory 1026 in which e.g. some parameters 1028 may be stored. The memory may be operatively connected to the processor. It should be appreciated that the memory may be a separate memory or included to the processor and/or the transceiver. The memory 1026 may be used to store information, for example, about thresholds, default values for B and K and/or for some other information.

FIG. 5 also illustrates the operational units as a computer code stored in the memory but they may also be implemented using hardware components or as a mixture of computer code and hardware components. FIG. 5 only illustrates some operational units related to the LBT functionalities, such as the LBT mode analyzer 1030 and the LBT mode switcher 1032, but in practical implementations the apparatus 110 may comprise other operational units as well.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A user equipment comprising:

at least one processor; and at least one memory storing instruction that, when executed on the at least one processor cause the user equipment to perform:

obtaining one or more configurations for at least one of a listen-before-talk on-mode and a listen-before-talk off-mode, wherein each configuration includes at least one functionality specific to an associated listen-before-talk mode;

examining which of the one or more configurations is associated with an indicated listen-before-talk mode;

selecting the configuration associated with the indicated listen-before-talk mode; and activating or deactivating the at least one functionality defined by the selected configuration in the operation of the user equipment, wherein the functionalities include one or more of the following:

slot format determination;

physical downlink control channel monitoring behavior;

user equipment discontinuous reception (DRX) and power saving features;

interference measurements and reporting;

channel state information measurements and reporting, wherein the activating or deactivating one or more of the functionalities comprises determining, based on the determined listen-before-talk mode, one or more of the following:

in slot format determination, whether the UE follows a semi-static Time Division Duplexing (TDD) configuration, or dynamic slot format adaptation based on an indication of Group Common-Physical Downlink Control Channel (PDCCH);

in physical downlink control channel monitoring, whether a physical downlink control channel search space group switching is disabled or enabled;

in DRX, whether the UE operates according to an OnDuration timer or according to a reduced OnDuration timer;

in interference measurements and reporting, whether averaging of interference measurements across multiple time instances is allowed or not;

in channel state measurements and reporting, whether averaging of channel state information measurements across multiple time instances is allowed or not.

2. The user equipment according to claim 1, wherein the determining comprises determining the listen-before-talk mode implicitly based on the associated configuration or explicitly based on an explicit indication.

3. The user equipment according to claim 1, wherein the determining comprises determining the listen-before-talk mode based on one or more of the following:

a received indication;

a link direction;

a bandwidth part;

a beam;

a beam pattern;

a beam pair link.

4. The user equipment according to claim 1, wherein the instructions, when executed by the at least one processor, further cause the user equipment to perform:

receiving the one or more configurations from a communication network; and storing the received configurations.

5. The user equipment according to claim 4, wherein the determining which listen-before-talk mode shall be applied obtains the indication by one of the following:

a radio resource control signalling; a media access control control element; layer 1 signalling.

6. The user equipment according to claim 5, wherein in listen-before-talk on-mode listen-before-talk procedure is performed prior to downlink transmissions only.

7. A method comprising:

obtaining one or more configurations for at least one of a listen-before-talk on-mode and a listen-before-talk off-mode, wherein each configuration includes at least one functionality specific to an associated listen-before-talk-mode;

examining which of the one or more configurations is associated with an indicated listen-before-talk mode;

selecting the configuration associated with the indicated listen-before-talk mode; and activating or deactivating the at least one functionality defined by the selected configuration in the operation of the user equipment, wherein the functionalities include one or more of the following:

slot format determination;

physical downlink control channel monitoring behavior;

user equipment discontinuous reception (DRX) and power saving features;

interference measurements and reporting;

channel state information measurements and reporting, wherein the activating or deactivating one or more of the functionalities comprises determining, based on the determined listen-before-talk mode, one or more of the following:

in slot format determination, whether the UE follows a semi-static Time Division Duplexing (TDD) configuration, or dynamic slot format adaptation based on an indication of Group Common-Physical Downlink Control Channel (PDCCH);

in physical downlink control channel monitoring, whether a physical downlink control channel search space group switching is disabled or enabled;

in DRX, whether the UE operates according to an OnDuration timer or according to a reduced OnDuration timer;

in interference measurements and reporting, whether averaging of interference measurements across multiple time instances is allowed or not;

in channel state measurements and reporting, whether averaging of channel state information measurements across multiple time instances is allowed or not.

8. The method according to claim 7 comprising: determining the listen-before-talk mode implicitly based on the associated configuration or explicitly based on an explicit indication.

9. The method according to claim 7, comprising determining the listen-before-talk mode based on one or more of the following:

a received indication;

a link direction;

a bandwidth part;

a beam;

a beam pattern;

a beam pair link.

10. The method according to claim 7, comprising obtaining the indication by one of the following: a radio resource control signalling;

a media access control control element; layer 1 signalling.

11. The method according to claim 7, comprising performing in listen-before-talk on-mode listen-before-talk procedure prior to downlink transmissions only.

* * * * *